United States Patent

Lee et al.

Patent Number: 5,815,203
Date of Patent: Sep. 29, 1998

[54] ZOOM TRACKING APPARATUS AND METHOD IN A VIDEO CAMERA

[75] Inventors: Seoung Eog Lee; Jin Soo Park, both of Kyungki-do, Rep. of Korea

[73] Assignee: Goldstar Co., Ltd., Seoul, Rep. of Korea

[21] Appl. No.: 540,238

[22] Filed: Oct. 5, 1995

Related U.S. Application Data

[63] Continuation of Ser. No. 246,213, May 19, 1994, abandoned.

[30] Foreign Application Priority Data

May 20, 1993 [KR] Rep. of Korea ................... 1993/8701
May 21, 1993 [KR] Rep. of Korea ................... 1993/8819

[51] Int. Cl.[6] ................................................. H04N 5/232
[52] U.S. Cl. ............................................. 348/358; 396/81
[58] Field of Search ............................ 348/345, 347, 348/358; 396/77, 79, 81, 82, 85, 91, 93; H04N 5/232

[56] References Cited

U.S. PATENT DOCUMENTS

| | | |
|---|---|---|
| 4,611,244 | 9/1986 | Kentaro et al. |
| 4,782,369 | 11/1988 | Park . |
| 5,003,339 | 3/1991 | Kikuchi et al. ................... 348/347 |
| 5,055,932 | 10/1991 | Hijikata ............................. 354/402 |
| 5,164,756 | 11/1992 | Hirasawa .......................... 354/400 |

*Primary Examiner*—Andrew Faile
*Assistant Examiner*—Andrew B. Christensen
*Attorney, Agent, or Firm*—Finnegan, Henderson, Farabow, Garrett & Dunner, L.L.P.

[57] ABSTRACT

A zoom tracking apparatus and method in a video camera. An offset adjustment is achieved by deriving applied voltage of the zoom position sensor only by use of data relating to positions of the zoom lens respectively associated with several optional points and corresponding positions of the focusing lens involving focusing while shifting the zoom lens in one direction. The offset adjustment is, thereby, achieved rapidly and accurately, and an accurate focus upon zoom tracking is obtained. The minimum quantity of trace data is stored in the internal ROM of the control circuit, while a trace tracking of the focusing lens associated with the shift of the zoom lens is achieved in a region where an error may occur possibly upon detecting the position of the zoom lens by use of a focusing evaluation value, thereby capable of achieving the trace tracking accurately.

6 Claims, 16 Drawing Sheets

ZOOM TRACKING APPARATUS AND METHOD IN A VIDEO CAMERA

This application is a continuation of application Ser. No. 08/246,213, filed May 19, 1994, now abandoned.

BACKGROUND OF THE INVENTION

The present invention relates to a zoom tracking apparatus and method in a video camera, and more particularly to a zoom tracking apparatus and method in a rear focusing type video camera, capable of achieving an accurate offset adjustment and accurate zoom tracking.

Referring to FIG. 1, there is illustrated a conventional apparatus for executing a zoom tracking and an offset adjustment in a rear focusing type video camera.

As shown in FIG. 1, the apparatus includes a zoom position sensor 2 for sensing the current position of a zoom lens 1 and a zoom motor driver 3 for generating a drive signal for driving a zoom motor 4 for shifting the zoom lens 1. The zoom position sensor 2 is provided with a variable resistor (not shown) receiving a signal from a D/A converter 5. As the zoom lens 1 is shifted by the zoom motor 4, the variable resistor of the zoom position sensor 2 receives an output signal from the D/A converter 5 and varies the voltage level of the received signal in accordance with its variation in resistance caused by the shift of the zoom lens 1. Accordingly, the zoom position sensor 2 detects the position of the zoom lens 1 by the variation in voltage.

The apparatus also includes an A/D converter 6 for encoding the voltage applied to the variable resistor of the zoom position sensor 2. The encoded signal from the A/D converter 6 is transmitted to a control circuit 7 which, in turn, recognizes the current position of the zoom lens 1 from the received signal.

A focus sensor 8 which is positioned at an origin and is adapted to sense a position of a focusing lens 10. The apparatus further includes a stepping motor driver 9, a stepping motor 11 driven by the stepping motor driver 9 and adapted to shift the focusing lens 10, and a focus detector 12 adapted to calculate the number of driven steps of the stepping motor 11. The calculated number of driven steps is sent to the control circuit 7 which, in turn, recognizes the is position of the focusing lens 10 on the basis of the received signal.

The control circuit 7 comprises a microprocessor equipped with a read only memory (ROM) storing various trace data respectively for various object distances from each possible position of the zoom lens 1. When the zoom lens 1 is shifted for executing a zooming, the focusing lens 10 is correspondingly shifted along a trace determined by a proper one of the trace data stored in the ROM.

In operation, however, the actual trace of the focusing lens 10 shifted upon shifting the zoom lens 1 has a difference (±α) from the theoretical trace determined by the trace data stored in the ROM, based on the shift range of the zoom lens 1 and the position of the focus sensor 8, as shown in FIG. 3. This difference is called an offset. Accordingly, this offset value should be corrected in order to achieve both the automatic focus adjustment and the zoom tracking in a rear focusing system. For proper offset adjustment the offset value and the shift range of the zoom lens 1 must be found.

Such an offset adjustment is executed by sending data from the control circuit 7 to a personal computer (PC) 13a. Now, a conventional offset adjustment will be described in conjunction with FIG. 4.

In accordance with the method illustrated in FIG. 4, first, the zoom lens 1 is shifted to an optional position regarded as a wide-end, that is, the point "a" of FIG. 5 (Step S1). Thereafter, the focusing lens 10 is shifted so as to achieve an accurate focusing (Step S2). The focusing lens 10 is then shifted again from its current position for obtaining the accurate focusing by an optional distance, that is, the distance "▌" of FIG. 5 (Step S3). Then, a position of the zoom lens 1 where the focusing is obtained, that is, the position "b" of FIG. 5 is searched while shifting the zoom lens 1 toward a tele-end (steps S4 and S5).

Thereafter, the zoom lens 1 is shifted again toward the wide-end by its variable shift range indicated by "γ" in FIG. 5 (Step S6). A search is then made whether the current position of the zoom lens 1 corresponds to the optional position "a" assumed as the wide-end at the first step S1 (Step S7).

If the current position of the zoom lens 1 corresponds to the optional position "a", it is then determined as corresponding to the position of the zoom lens 1 returned at the step S6. When the current position of the zoom lens 1 does not correspond to the optional position "a", it does not correspond to the position of the zoom lens 1 returned at the step S6. In the latter case, the focusing lens 1 is then shifted an optional distance, that is, the distance "▌" of FIG. 5. Thereafter, the above procedure is repeated so as to find the tele-end and the wide-end.

The difference between the actual position of the focusing lens 10 and the theoretical position based on the trace data stored in the ROM of the control circuit 7 is the offset. For such offset adjustment, however, the conventional method requires a lot of time for the zoom lens to be reciprocated. This method also produces poor focusing upon zoom tracking because the offset value is derived only at the wide-end and the tele-end, thereby disabling trace error from being taken into consideration.

In the conventional zoom tracking, recognition of positions of the zoom lens 1 and the focusing lens 10 is achieved in the same manner as mentioned above. The zoom tracking is executed by positioning the zoom lens 1 such that the zooming is initiated at a position where there is no erroneous determination for the trace caused by a read error of the control circuit 7 before the user executes the zooming, that is, at the point α of FIG. 6, positioning the focusing lens 10 at a position where an accurate focusing is obtained, and then calculating object distances a, b and c by use of data about the position of the zoom lens 1 where the zooming is initiated, that is, the point a of FIG. 6 and data about the position of the focusing lens 10.

Where the position of the object corresponds to the object distances a and c, the focusing lens 10 can be shifted along a trace associated with the object distances a and c upon shifting the zoom lens 1. Accordingly, the zoom tracking is achieved.

However, where the object to be tracked and imaged by the zoom lens is positioned at a position b involving no trace data stored in the internal ROM of the control circuit 7, a detection is made for trace data associated with positions a and c of the upper and lower objects near to the object to be tracked and imaged, among trace data for all possible positions stored in the internal ROM of the control circuit 7. Thereafter, a calculation is made for the difference Da between the position of the focusing lens 10 associated with the upper object position a and the position of the focusing lens 10 associated with the lower object position c at a zooming start point, that is, the point α of FIG. 6, and the difference da between the position of the focusing lens 10 associated with the position b of the object to be tracked and imaged and the position of the focusing lens 10 associated with the lower object position c. Based on the calculated position differences Da and da, the position db of the focusing lens 10 associated with the position b of the object to be tracked and imaged is calculated. This calculation can be achieved using the following equation:

$$db = Db \frac{da}{Da}$$

As the zoom lens 1 is shifted, the focusing lens 10 tracks a trace stored in the internal ROM of the control circuit 7 or a trace defined by the calculation, thereby achieving a zoom tracking.

In the conventional rear focusing system, however, the A/D converter 6 encodes a differential voltage applied to the variable resistance of the zoom position sensor and sends the encoded signal to the control circuit 7 so that the position of the zoom lens 1 can be recognized. the position of the focusing lens 10 is recognized using the number of driven steps of the stepping motor 11 with reference to the origin. As a result, accurate in recognition of the zoom lens position and sufficient resolution of the A/D converter are required.

By one-bit error of the A/D converter 6, the position b of the object to be tracked and imaged may be erroneously determined as the upper object position a or the lower object position c, as shown in FIG. 7. In this case, the focusing lens 10 tracks the trace associated with the upper object position a or the lower object position c, thereby resulting in a bad focusing. This tendency is gradually increased as the zoom lens 1 moves toward the tele-end.

Such a problem can not be solved by checking the shifted steps of the focusing lens 10 and the resolution of an 8-bit A/D converter ($2^8$=256). As a result, a quantity of data should be stored in the internal ROM of the control circuit. This results in an increase in data storage capacity and thereby an over-load of the control circuit.

SUMMARY OF THE INVENTION

Therefore, an object of the invention is to solve the above-mentioned problems encountered in the prior art and, thus, provide a zoom tracking apparatus and method in a video camera, wherein an offset adjustment is achieved by deriving applied voltage of the zoom position sensor only by use of data about positions of the zoom lens respectively associated with several optional points and corresponding positions of the focusing lens involving focusing while shifting the zoom lens in one direction, thereby capable of achieving the offset adjustment rapidly and accurately and obtaining an accurate focus upon zoom tracking.

Another object of the invention is to provide a zoom tracking apparatus and method in a video camera, wherein the minimum quantity of trace data is stored in the internal ROM of the control circuit while trace tracking of the focusing lens associated with the shift of the zoom lens is achieved in a region where an error may occur possibly upon detecting the position of the zoom lens by use of a focusing evaluation value, thereby capable of achieving the trace tracking accurately.

In accordance with one aspect, the present invention provides a zoom tracking apparatus in a video camera, comprising: a zoom lens for zooming an object; a focusing lens for focusing the object; photoelectric conversion means for converting a video signal passing through the zoom lens and the focusing lens into an electrical signal; evaluation value detection means for detecting an evaluation value from the output signal of the photoelectric conversion means; position detection means for detecting a position of the zoom lens and a position of the focusing lens; and control means for performing an offset adjustment by use of position data of both the zoom lens and the focusing lens outputted from the position detection means and controlling a zoom tracking by use of position data of both the zoom lens and the focusing lens corresponding to a maximum evaluation value.

In accordance with another aspect, the present invention provides a zoom tracking method in a video camera including a zoom tracking apparatus having a zoom lens, a zoom position sensor, an A/D converter for encoding an output voltage of the zoom position sensor, control means for controlling the overall system of the zoom tracking apparatus, a focusing lens, a focus sensor, a focus detector for sending data about a position of the focusing lens sensed by the focus sensor to the control means, and a personal computer for receiving data from the control means and executing a calculation for an offset adjustment, the zoom tracking method comprising: a voltage range conforming step for conforming the zoom position sensor with the A/D converter in voltage range for zooming from the tele-end to the wide-end; a level shifting step for executing a level shifting to obtain a constant offset value; an end conforming step for conforming the tele-end and wide-end of the zoom position sensor with those of the A/D converter, respectively: and a zoom tracking step for executing a zoom tracking, the zoom tracking step comprising a first object distance calculating step for calculating the object distance, based on position data of both the zoom lens and the focusing lens associated with a maximum evaluation value obtained where the zoom lens passes through a point where there is no erroneous determination for the trace based on the object distance caused by a read error of the control circuit generated upon reading the position of the zoom lens, a second object distance calculating step for calculating the object distance, based on position data of both the zoom lens and the focusing lens associated with trace data for object distance where the zoom lens passes through a region where traces remarkably distinguished from other traces are generated irrespective of the read error of the control circuit generated upon reading the position of the zoom lens, and a zoom tracking execution step for executing a zoom is tracking, based on data about object distance obtained by the calculation of the first object distance calculating step or the calculation of the second object distance calculating step.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
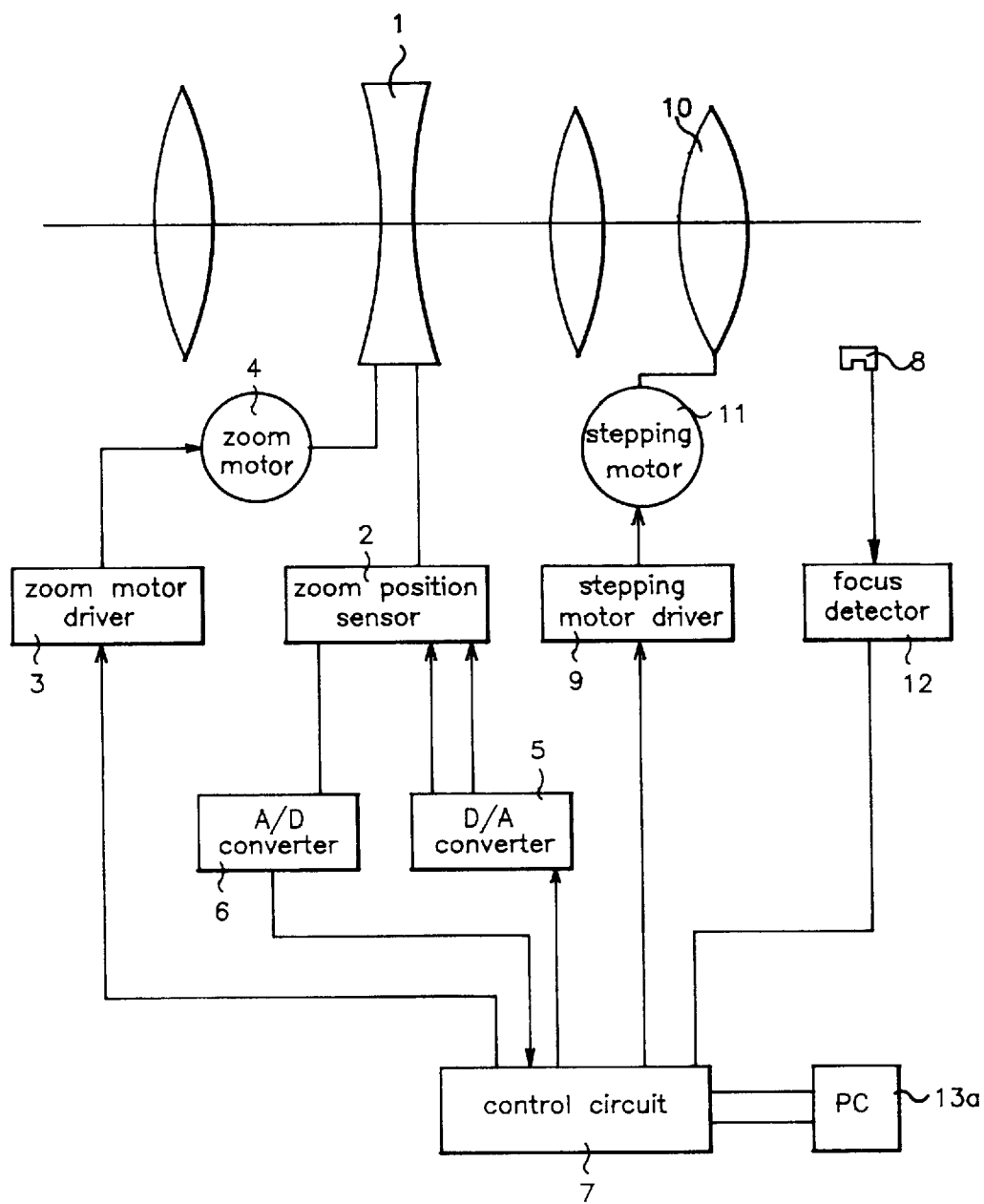
FIG. 1 is a block diagram of a conventional zoom tracking apparatus.
Figure 2:
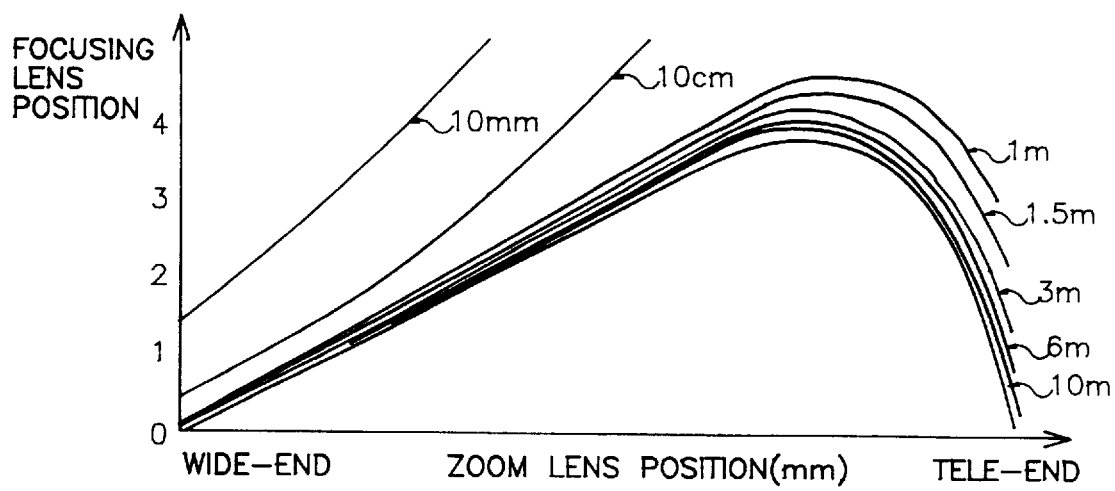
FIGS. 2, 3 and 6 are diagrams respectively illustrating traces of a focusing lens associated with various object distances at a position of a zoom lens in accordance with the prior art.
Figure 3:
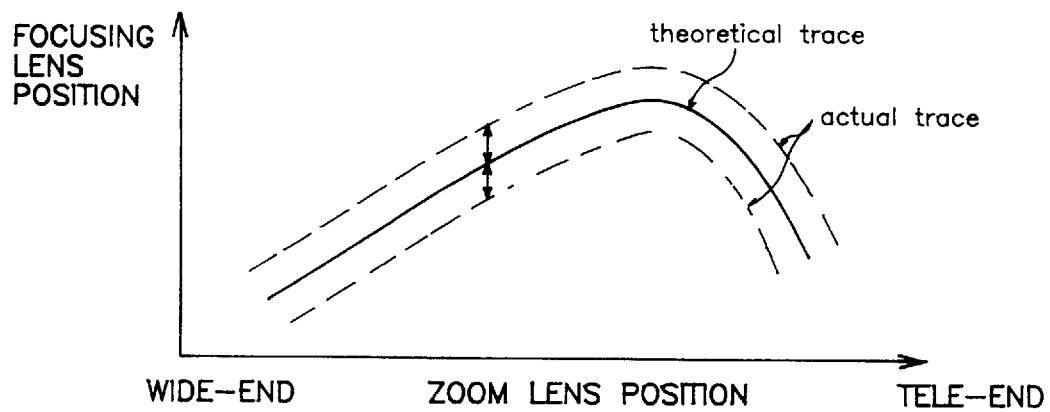
Figure 4:
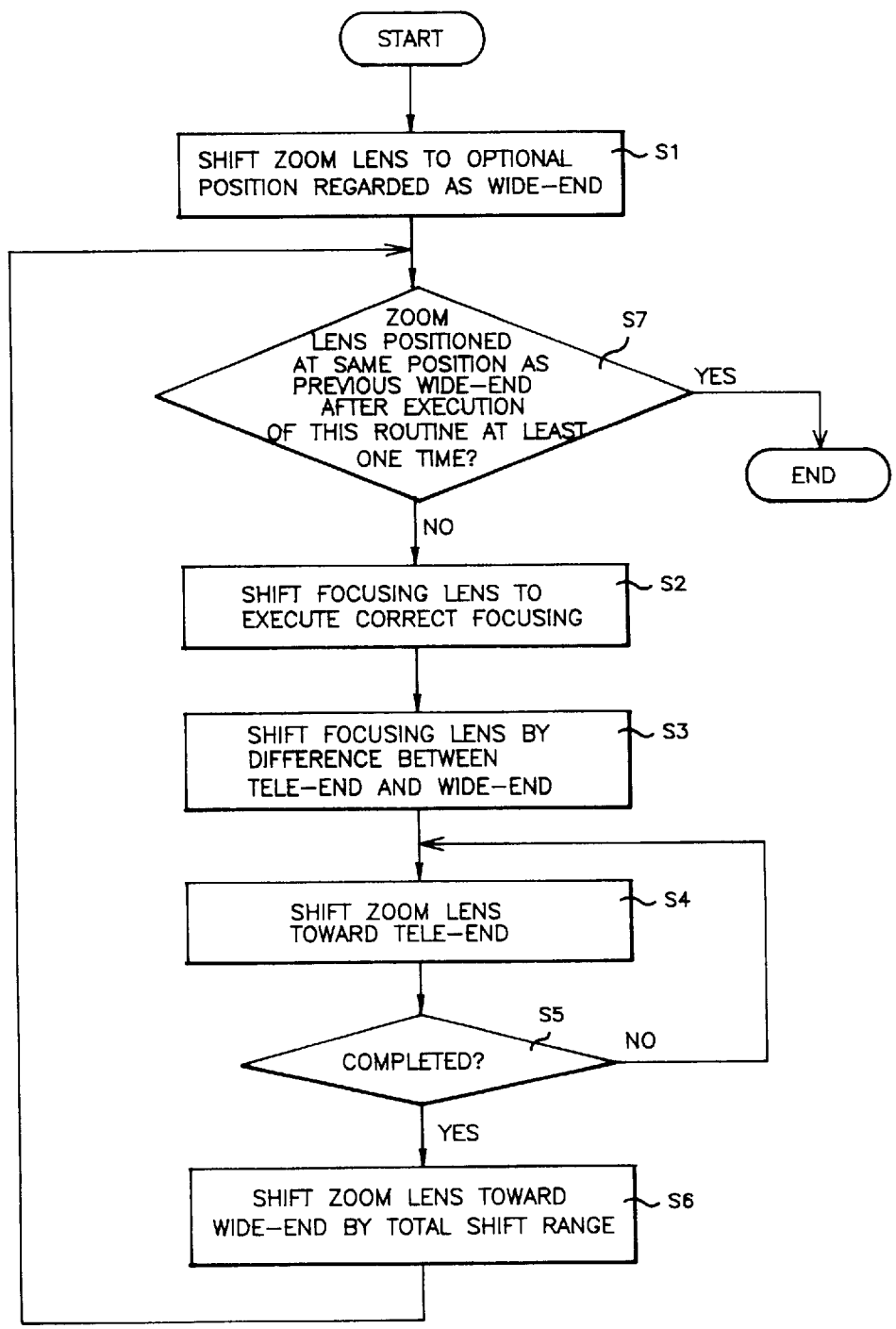
FIG. 4 is a flow chart illustrating a conventional offset adjusting method.
Figure 5:
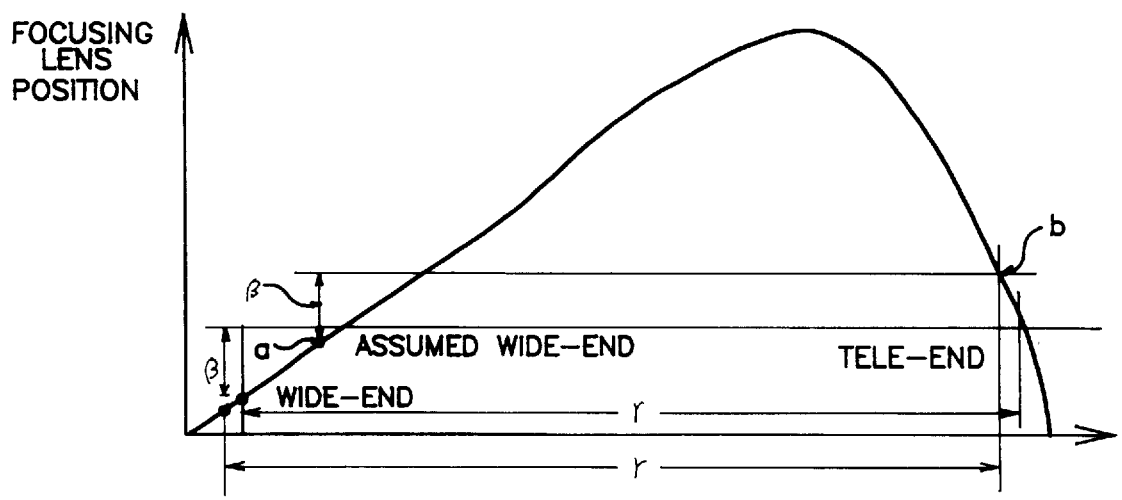
FIG. 5 is a diagram illustrating a positional relationship between the zoom lens and the focusing lens in accordance with the conventional offset adjusting method.
Figure 6:
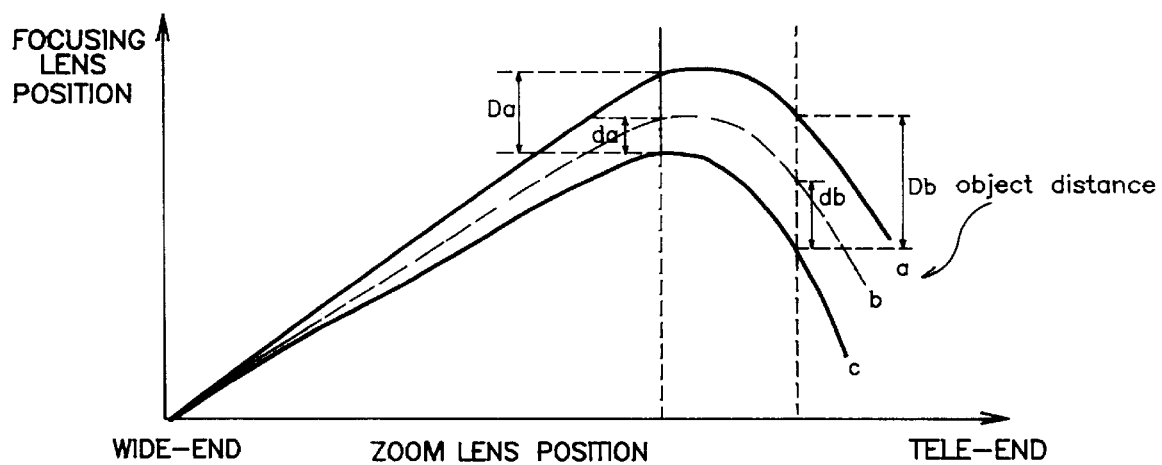
Figure 7:
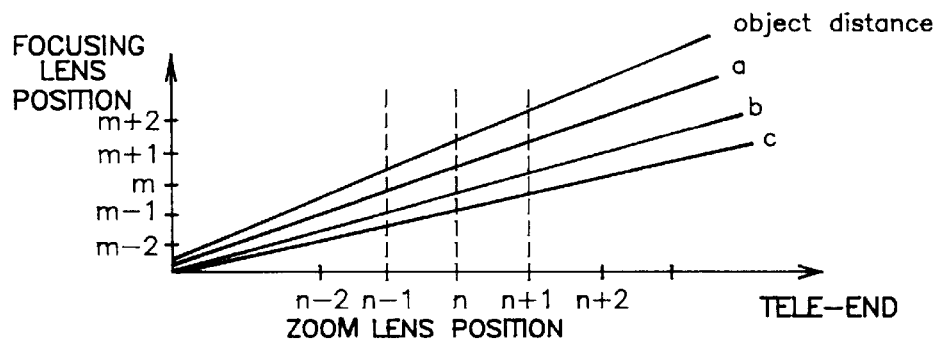
FIG. 7 is a diagram illustrating traces at the wide-end shown in FIG. 6.
Figure 8:
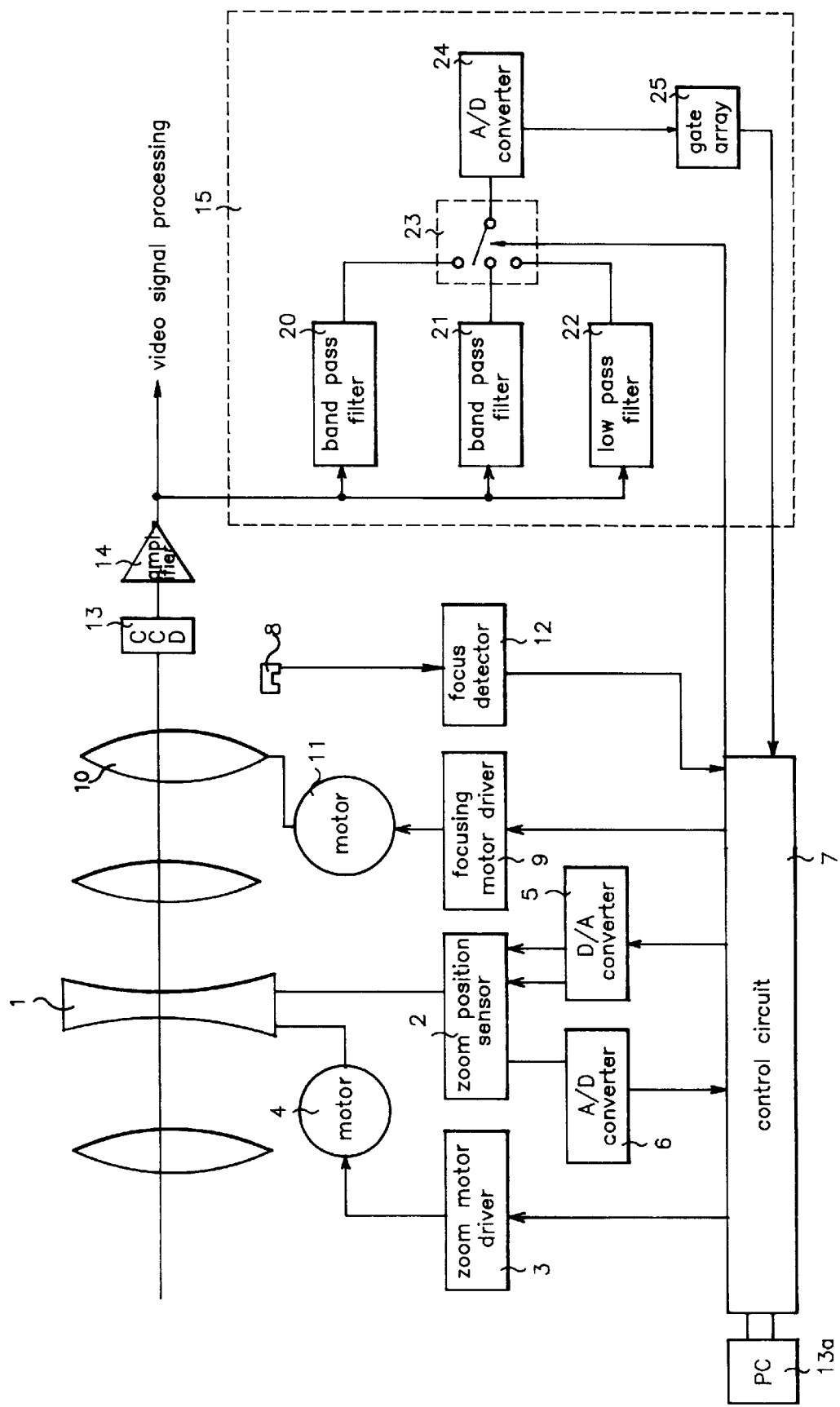
FIG. 8 is a block diagram of a zoom tracking apparatus in accordance with the present invention.

FIG. 8 is a block diagram of a zoom tracking apparatus of a video camera in accordance with the present invention. This apparatus includes the elements of the conventional zoom tracking apparatus shown in FIG. 1 as its constituting elements. In FIG. 8, elements corresponding to those shown in FIG. 1 are denoted by the same reference numerals, respectively. The zoom tracking apparatus of the present invention further includes a charge coupled device (CCD) serving as photoelectric conversion means for converting an optical image emerging from the focusing lens 10 into an electrical video signal, an amplifier 14 for amplifying an output video signal from the CCD 13, and an evaluation value detecting circuit 15 for detecting an evaluation value from the video signal amplified by the amplifier 14 and sending the detected evaluation value to the control circuit 7. The control circuit 7 performs an offset adjustment, based on an applied voltage of the zoom position sensor 2. PC 13a derives that applied voltage using data on both the positions of the zoom lens 1 corresponding to several optional points selected while shifting the zoom lens 1 only in one direction and the positions of the focusing lens 10 where correct focusing for each of the optical points is achieved for the zoom lens 1. The control circuit 7 also calculates an object distance, based on position data of both the zoom lens 1 and the focusing lens 10 at the maximum evaluation value. Based on the calculated object distance, the control circuit 7 controls zoom tracking.

Figure 14:
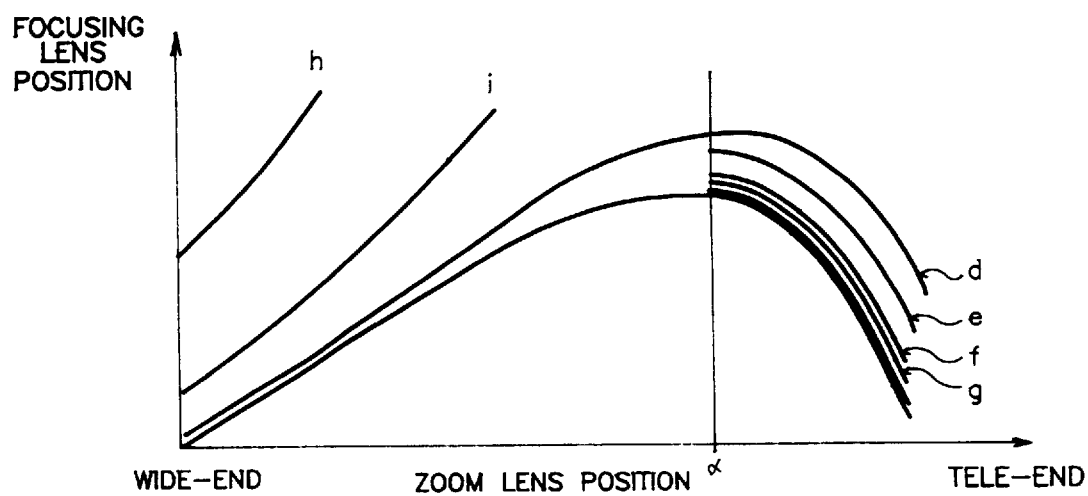
FIGS. 14 and 16 to 19 are diagrams respectively illustrating traces of a focusing lens associated with various object distances at a position of a zoom lens in accordance with the present invention.

The control circuit 7 stores in its internal ROM various trace data for the focusing lens 10 associated with various positions of the zoom lens 1. For each tele-end-side position of the zoom lens 1 with respect to a reference position of the zoom lens 1 where there is no erroneous determination for the trace based on the object distance caused by a read error of the control circuit 7 generated upon reading the position of the zoom lens 1 (the point α of FIG. 14), the control circuit 7 stores the trace data of the focusing lens 10 associated with various object distances between the maximum object distance d and the minimum object distance g, for example, including object distances d, e, f and g. For each wide-end-side position of the zoom lens 1 with respect to the reference position, the control circuit 7 stores the trace data of the focusing lens 10 associated with only the maximum and minimum object distances d and g. The control circuit 7 also stores the trace data of the focusing lens 10 associated with object distances h and i generating traces remarkably distinguished from other traces irrespective of the read error of the control circuit 7 generated upon reading the position of the zoom lens 1.

As shown in FIG. 8, the evaluation value detecting circuit 15 includes a pair of band pass filters 20 and 21 each detecting a radio frequency component from the video signal outputted from the amplifier 14 and determines whether an accurate focusing is obtained, based on the result of the detection. A low pass filter 22 detects a low frequency component from the video signal outputted from the amplifier 14 and determines a variation in luminance, based on the result of the detection. A switching circuit 23 selectively extracts output signals of the band pass filters 20 and 21 and the low pass filter 22 under the control of the control circuit 7. A A/D converter 24 converts the signal selectively extracted by the switching circuit 23 into a digital signal. A gate array 25 divides the digital data from the A/D converter 24 into a plurality of data portions, performs a digital integration for the data portions, sums all digital values of the integrated data portions to obtain an evaluation value, and sends the evaluation value to the control circuit 7.

Figure 9:
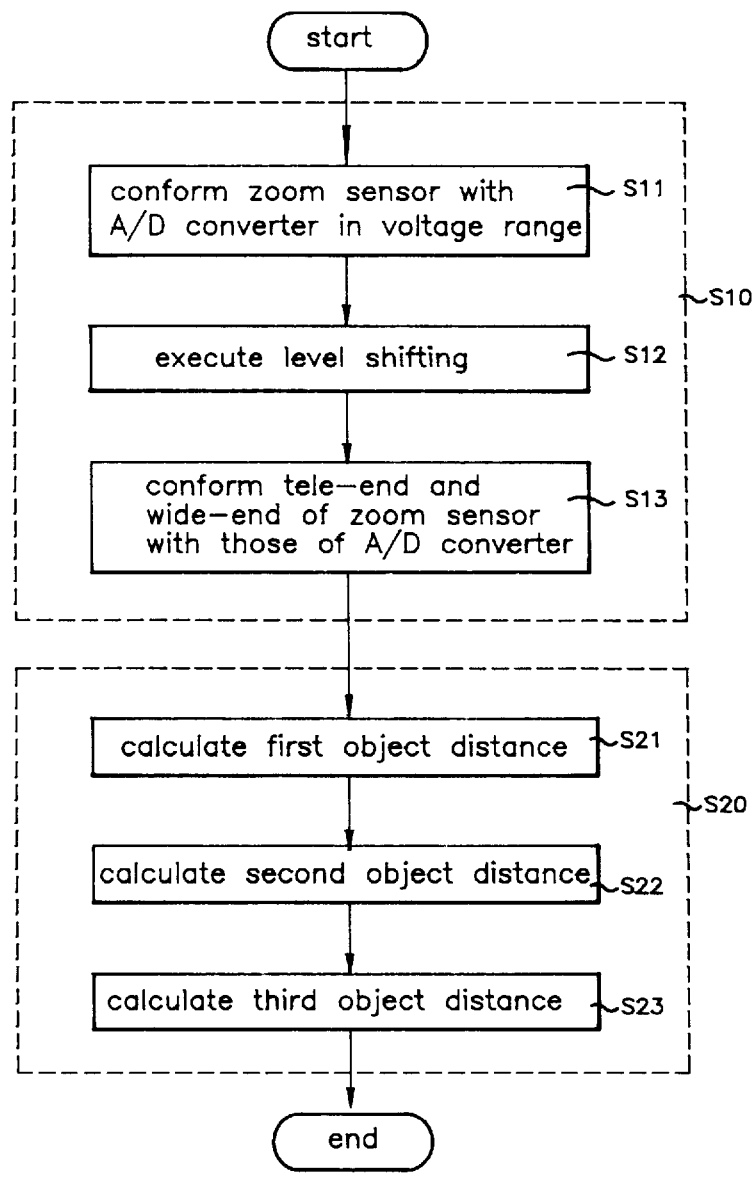
FIG. 9 is a flow chart illustrating a zoom tracking method in accordance with the present invention.

FIG. 9 is a flow chart illustrating a zoom tracking method for a video camera in accordance with the present invention. The zoom tracking method of the present invention includes an offset adjustment step S10 and a zoom tracking step S20. The offset adjustment step S10 includes three steps: a voltage range conforming step S11 for conforming the zoom position sensor 2 with the A/D converter 6 in a voltage range for zooming from the tele-end to the wide-end; a level shifting step S12 for executing a level shifting to obtain a constant offset value; and an end conforming step S13 for conforming the tele-end and wide-end of the zoom position sensor 2 with those of the A/D converter 6, respectively. The zoom tracking step S20 also includes three steps: a first object distance calculating step. S21 for calculating the object distance, based on position data of both the zoom lens 1 and the focusing lens 10 associated with the maximum evaluation value obtained where the zoom lens 1 passes through a point where there is no erroneous determination for the trace based on the object distance caused by a read error of the control circuit 7 generated upon reading the position of the zoom lens 1; a second object distance calculating step S22 for calculating the object distance, based on position data of both the zoom lens 1 and the focusing lens 10 associated with trace data for object distance where the zoom lens 1 passes through a region where traces remarkably distinguished from other traces are generated irrespective of the read error of the control circuit 7 generated upon reading the position of the zoom lens 1; and a zoom tracking execution step S23 for executing a zoom tracking, based on data on object distance obtained by the calculation of the steps S21 and S22.

Figure 10:
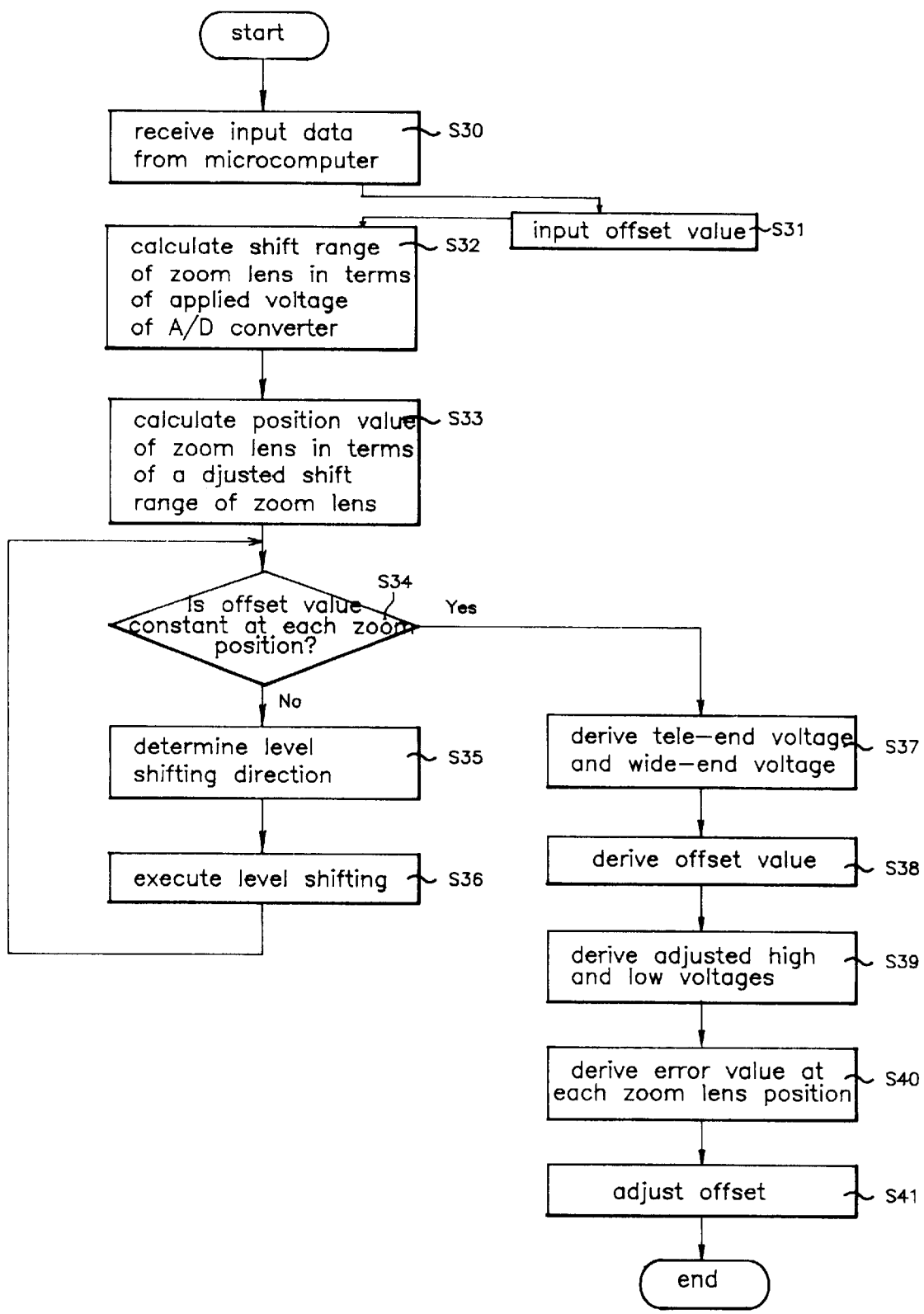
FIG. 10 is a flow chart illustrating an offset adjustment in accordance with the present invention.

As mentioned above, the offset adjustment for achieving the zoom tracking in accordance with the present invention is accomplished by the offset adjusting step S10 of FIG. 9. This is offset adjustment will now be described in conjunction with FIG. 10.

At a step S30, first, the PC 13a receives, via the control circuit 76, various data: high-level and low-level voltages ZPH and ZPL currently applied to the zoom position sensor 2; a voltage Va having a voltage range of 5 volts for a zooming from the tele-end to the wide-end; high-level and low-level voltages ADH and ADL applied to the A/D converter 6; data indicative of the resolution of the A/D converter 6; coded values from the A/D converter 6 for the tele-end and wide-end; and data on object distance. The PC 13a also receives a coded value a from the A/D converter 6 corresponding to a position of the zoom lens 1 shifted by the zoom motor 4 under control of the zoom motor driver 3, and shifted-position data of the focusing lens 10 associated with the shift of the zoom lens 1.

Thereafter, several zoom positions are set and a search for a focus associated with each of the zoom positions is made at a step S31. The PC 13a receives data (A/D-converted code) on zoom position recognized by the control circuit 7 for each set zoom position and data about a position of the focus lens 10 recognized by the control circuit for each searched focus.

The current shift range of the zoom lens 1 is then calculated in terms of the voltage applied to the A/fD converter 6, by use of the high-level and low-level voltages ZPH and ZPL currently applied to the zoom position sensor 2, the voltage Va having the voltage range of 5 volts for the zooming from the tele-end to the wide-end, and the high-level and low-level voltages ADH and ADL applied to the A/D converter 6. The position value of the zoom lens 1 is also calculated in terms of the adjusted shift range of the zoom lens 1. This calculation is executed at a step S33 in accordance with the following equation:

$$a^1 = a*(ADL-ADL/\text{Resolution})*(TEC-WEC)/Va+TEC$$

where,
- $a^1$: Calculated zoom Lens Position Code,
- a: Input Zoom Lens Position Code,
- ADH: Applied High voltage to A/D Converter,
- ADL: Applied Low Voltage to A/D Converter,
- TEC: Adjusted Target Tele-End Code from A/D Converter,
- WEC: Adjusted Target Wide-End Code from A/D Converter,
- Resolution: Resolution of A/D Converter, and
- Va: voltage Ranged for Zooming from Adjusted Tele-End to Adjusted W495 ide-End.

Figure 11A:
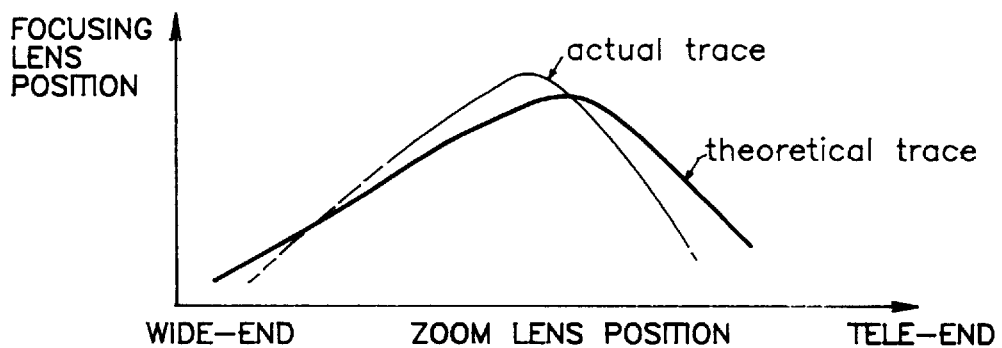
FIGS. 11A to 11C are diagrams respectively illustrating a relationship between an actual trace and a stored theoretical trace.
Figure 11B:
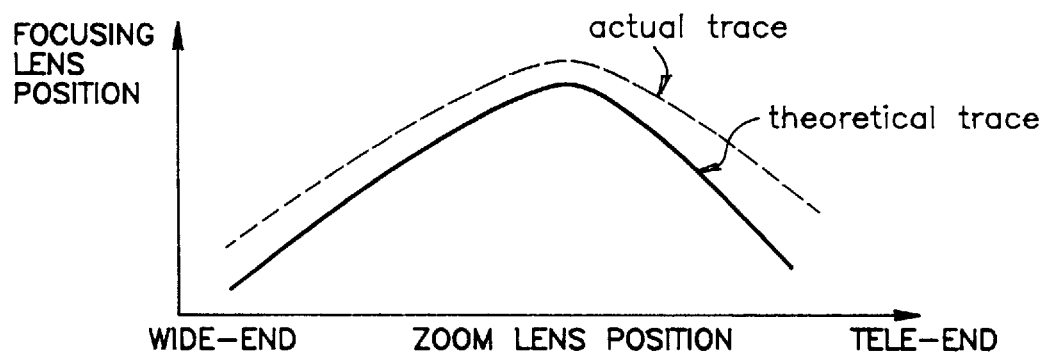

Thereafter, a determination is made whether the difference between the actual trace and the theoretical trace based on stored trace data, (the offset value) is constant (Step S34). Based on the result of the determination at the step S34, the position of the focusing lens 10 is searched in a manner as shown in FIGS. 11a and 11b.

The checking of the offset value at the step S34 may be achieved by deriving an average of all possible positions of the zooming lens 1 and deriving a deviation of each of the positions from the average or by deriving a partial average of several positions between the wide-end and the tele-end.

Figure 11C:
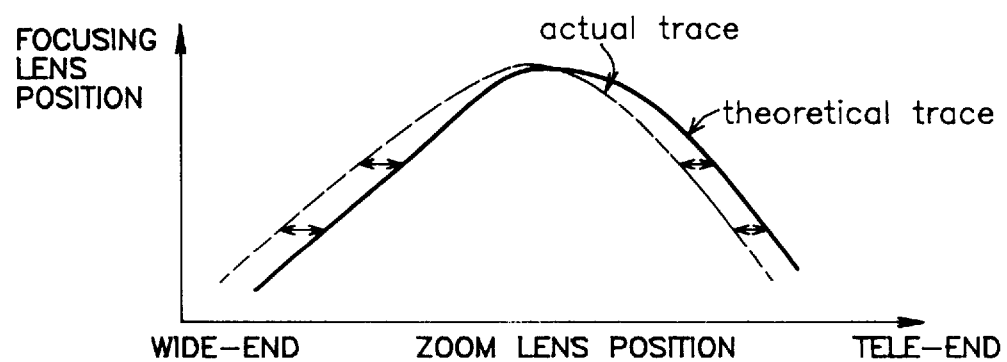

When the difference between the actual trace and the theoretical trace has been determined to be irregular at the step S34, the level shifting direction is determined at a step S35. That is, when the position difference of the focusing lens 10 at the wide-end is more than that at the tele-end, the level shifting toward the tele-end is determined and then executed (Step S36). Where the position difference of the focusing lens 10 at the wide-end is less than that at the tele-end, the level shifting toward the wide-end is determined and then executed. During the level shifting, the difference between the actual trace and the theoretical trace is continuously checked until the position difference of the focusing lens 10 is constant at all positions between the wide-end and the tele-end, as shown in FIG. 11c. When the position difference of the focusing lens 10 is constant at all positions, the level shifting is stopped and the tele-end voltage, the wide-end voltage, and the offset value at this state are derived (Steps S37 and S38). The values can be derived by use of the following equations:

$$ZTE'(V) = ABTV \pm \text{Number of Shifted Steps}*Vb/(TEC-TWC)$$

$$ZWE'(V) = ZTE' + Vb$$

where,
- ZTE': Tele-End Voltage of Zoom Lens,
- ZWE': wide-End voltage of Zoom Lens, and
- ADTV: Voltage Corresponding to TEC.

The above equations are applied for TEC<WEC. If TEC>WEC, parameters for the wide-end and parameters for the tele-end in the equations ate exchanged.

After completing the above procedure, low-level and high-level voltages of the zoom position sensor 2 are derived which are those adjusted so that the tele-end and wide-end voltages may be equal to the target tele-end and wide-end voltages of the A/D converter 6, respectively (step S39). These voltages can be derived by use of the following equations:

$$ZPL' = \frac{ADTV*Ry - ADWV*Rx}{Ry - Rx}$$

$$ZPH' = \frac{ADTV*(1-Ry) - ADWV*(1-Rx)}{Rx - Ry}$$

where,
- ZPL': Applied Low-Level Voltage of Zoom Position Sensor,
- ZPH': Applied High-Level Voltage of zoom Position Sensor,
- ADTV: Voltage of A/D converter Corresponding to Tele-End
- ADWV: voltage of A/D converter Corresponding to Wide-End,
- Rx: Resistance Ratio at Tele-End, and
- Ry: Resistance Ratio at Wide-End.

Based on the offset value derived as mentioned above, a trace error value at each position of the zoom lens 1 is then derived (Step S40). In this case, the error value corresponds to trace data obtained by correcting the actual focusing position data (namely, initial input data) by the offset value.

Figure 12:
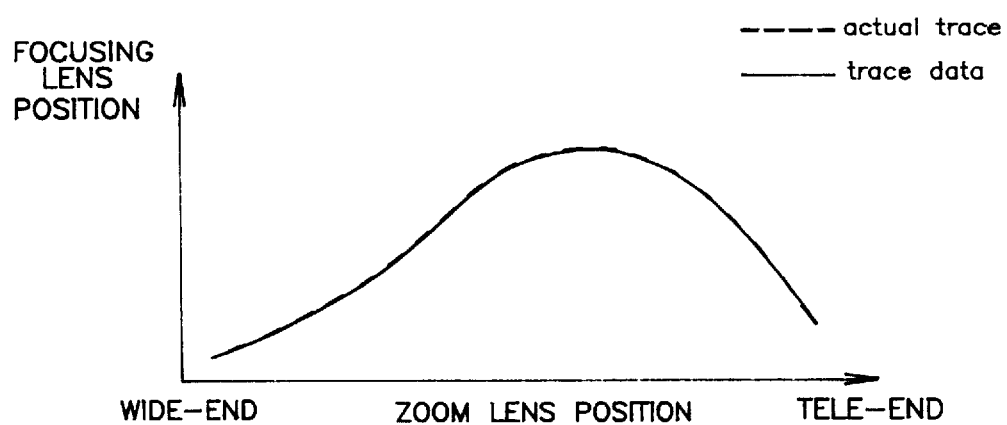
FIG. 12 is a diagram illustrating a relationship between an actual trace and a theoretical trace stored after execution of the offset adjustment in accordance with the present invention.
Figure 13A:
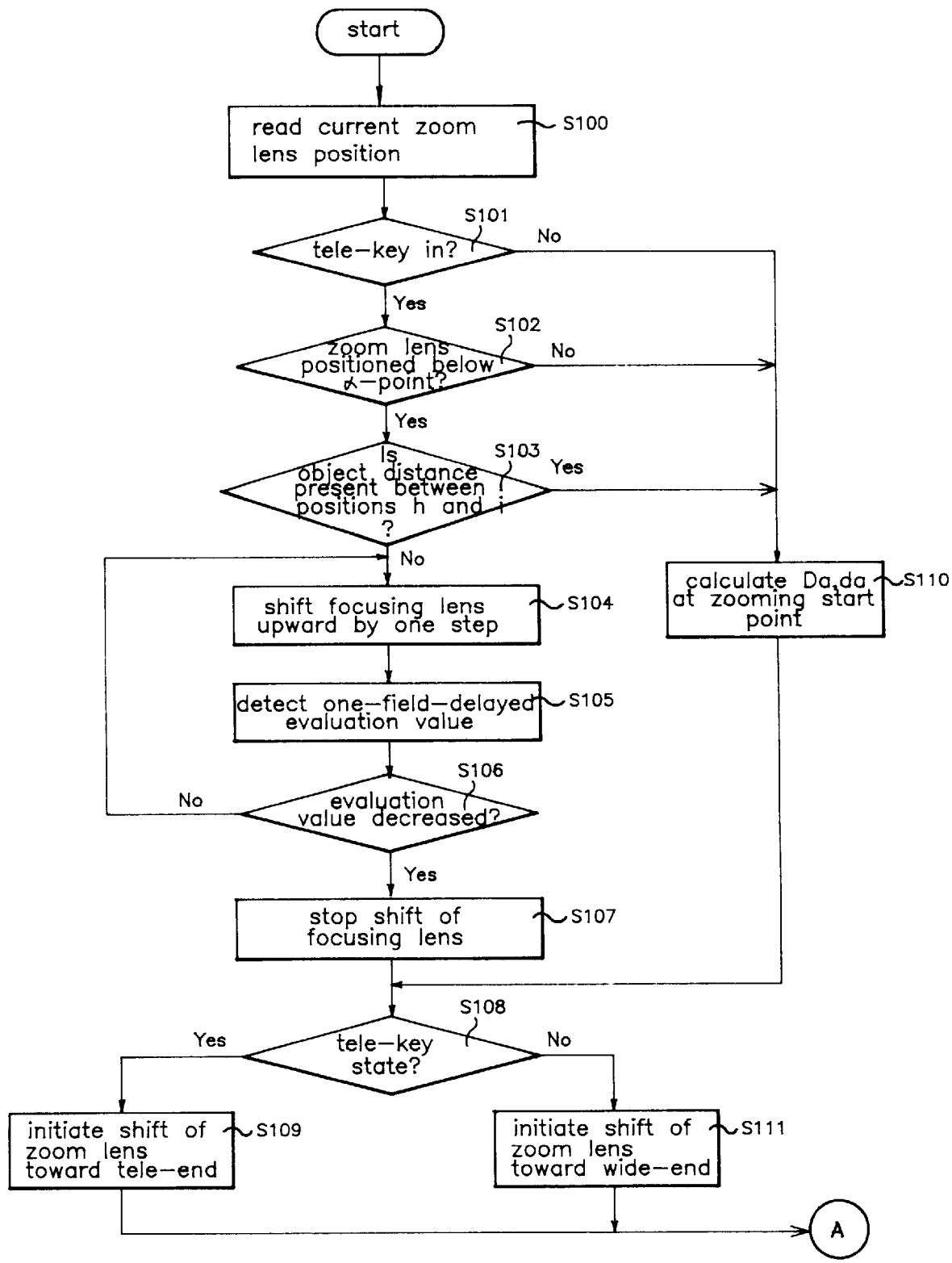
FIGS. 13A and 13B are flow charts respectively illustrating a zoom tracking in accordance with the present invention.
Figure 13B:
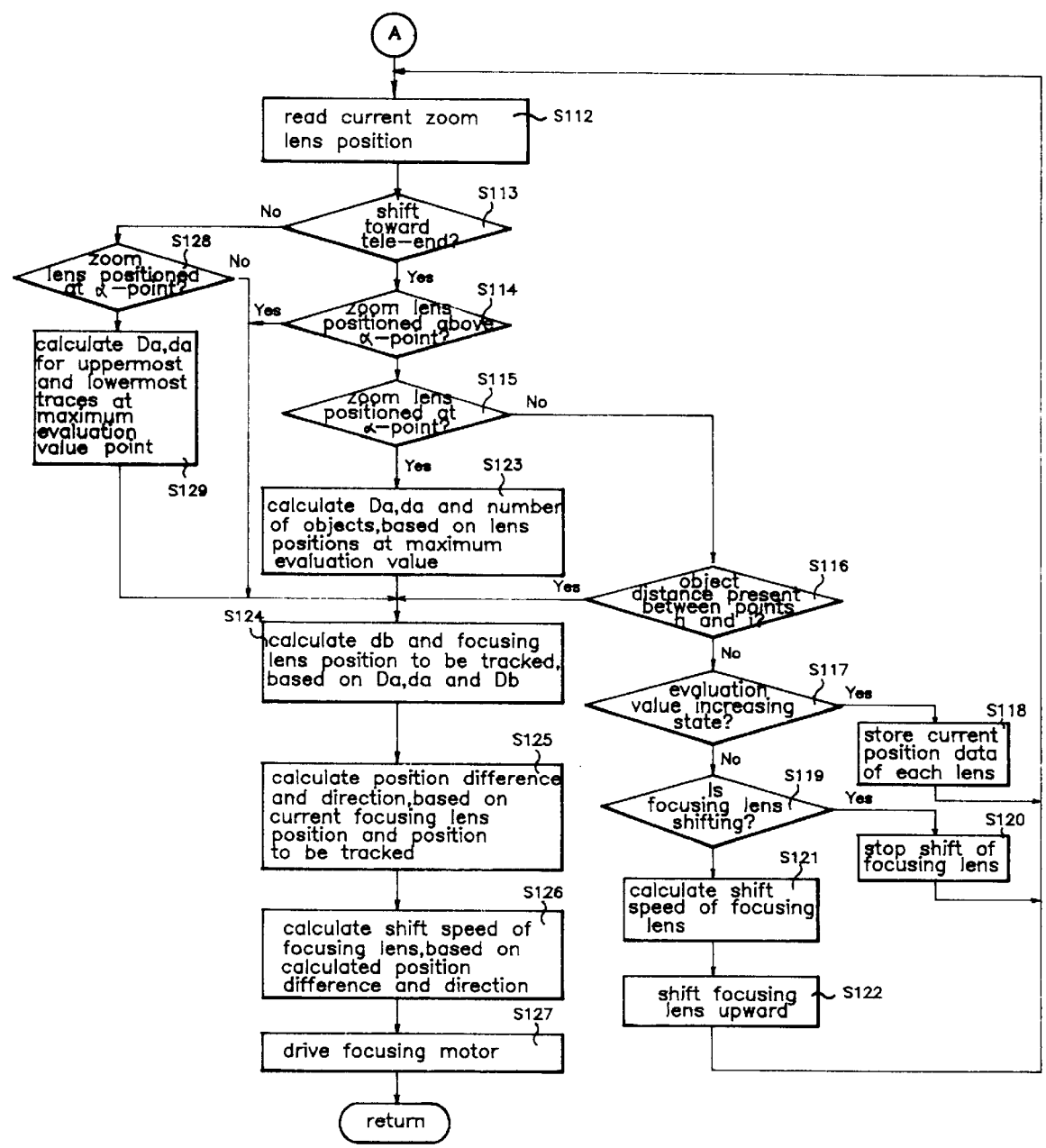

Thereafter, the applied high-level and low-level voltages of the zoom position sensor 2, the offset value and the error value are sent to the control circuit 7 which, in turn, performs an offset adjustment, based on the received data, as shown in FIG. 12 (Step S41).

Otherwise, the offset determination executed in the offset adjustment procedure for achieving the zoom tracking in accordance with the present invention may be achieved by deriving an average of offset values at all positions, by sampling a representative offset value, or by deriving an average of offset values except for the maximum and minimum offset values.

The zoom tracking in accordance with the present invention will now be described.

First, an optical image passing through the zoom lens 1 and then the focusing lens 10 is sent to the CCD 13 which, in turn, converts the received optical image into an electrical signal. This video signal is then amplified by the amplifier 14 and sent to a video signal processing circuit not shown. The video signal is also sent to the band pass filters 20 and 21 and the low pass filter 22 so that it can be transmitted to the switching circuit 23 in the form of radio frequency components to be used for searching the focusing state and a low frequency component to be used for searching a variation in luminance.

The switching circuit 23 selects repeatedly one of the filters 20 to 22 under control of the control circuit 7, so as to sample output signals from the filters 20 to 22 in predetermined intervals. The sampled signals are sequentially transmitted to the A/D converter 24 which, in turn, converts the received signals into digital signals. The digitalized sampling data from the A/D converter 24 is then sent to the gate array 25 which, in turn, divides the sampling data into a plurality of data portions in accordance with a predetermined data division. Thereafter, the gate array 25 performs a digital integration for the data portions, sums all digital values of the integrated data portions to obtain an evaluation value, and sends the evaluation value to the control circuit 7. Based on the received evaluation value, the control circuit 7 executes the zoom tracking. This procedure will now be described.

First, the current position of the zoom lens 1, namely, the zooming start point is detected by the zoom position sensor 2 (Step S100). Thereafter, a determination is made whether the zoom lens 1 is to be shifted toward the tele-end or toward the wide-end (Step S101). Where the zoom lens 1 is to be shifted toward the tele-end, a determination is made whether the current position of the zoom lens 1 corresponds to a wide-end-side position with respect to a reference position of the zoom lens 1 where there is no erroneous determination for the trace based on the object distance caused by a read error generated upon reading the position of the zoom lens 1, that is, the point α of FIG. 14 (Step S102). If the current position of the zoom lens 1 corresponds to the wide-end-side position, a determination is then made whether the current object distance b is present between object distances h and i generating traces remarkably distinguished from other traces (Step 103).

Figure 15:
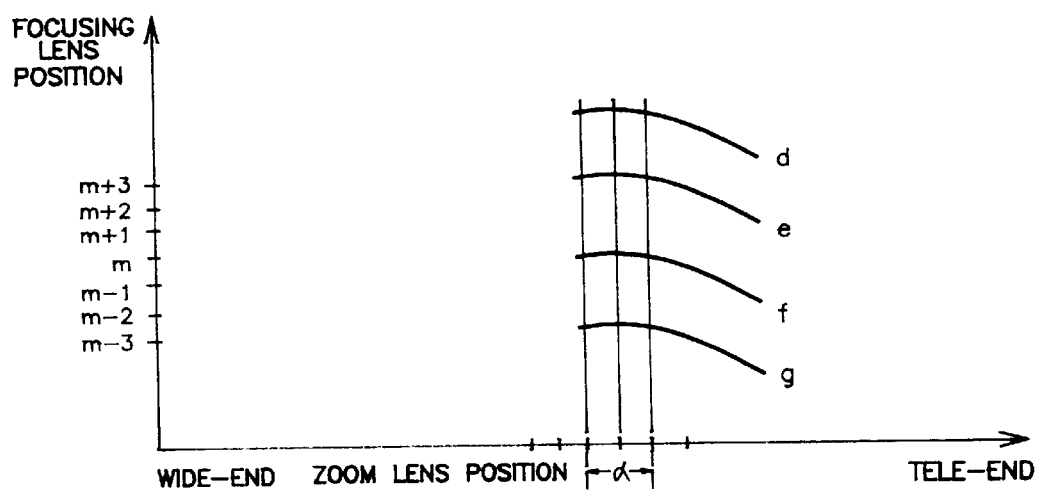
FIG. 15 is a diagram illustrating traces present at a position, shown in FIG. 14, where there is no erroneous determination for the trace based on the object distance caused by a read error.
Figure 16:
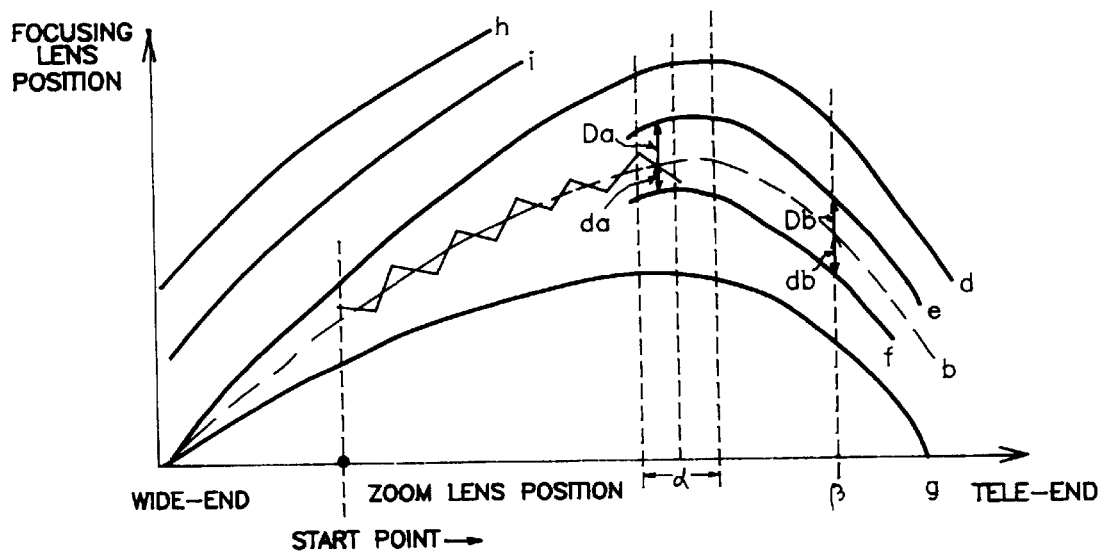

Actually, the reference position where there is no erroneous determination for the trace based on the object distance caused by the read error is not defined by one point, but defined by a predetermined region, as shown in FIG. 15, Accordingly, trace data for various object distances, for example, including the object distances d, e, f and g are present in the predetermined region.

Where the current object distance b has not been determined to be present between object distances h and i generating traces remarkably distinguished from other traces at the step S103, that is, where the trace associated with the current object distance b is not present between traces respectively associated with the maximum and minimum object distances d and g, the stepping motor 11 is driven so that the focusing lens 10 can be shifted upward by one step, as shown in FIG. 16 (Step S104). Subsequently, a step S105 is executed for detecting an evaluation value of one-field-delayed video signal by the evaluation value detector 15, Based on the result of the detection, a variation in evaluation value is checked.

When an increment in evaluation value has been checked at the step S105, the steps S104 and S105 are repeatedly executed so that a variation in evaluation value can be checked again while shifting the focusing lens 10 upward by one step. This procedure is continued until the focusing lens 10 reaches a point where the evaluation value being incremented is decremented. This point is regarded as the point where the maximum focal distance is obtained. If the point is detected at the step S106, the driving of the stepping motor 11 is then stopped in order to stop the shift of the focusing lens 10 (Step S107).

Figure 17:
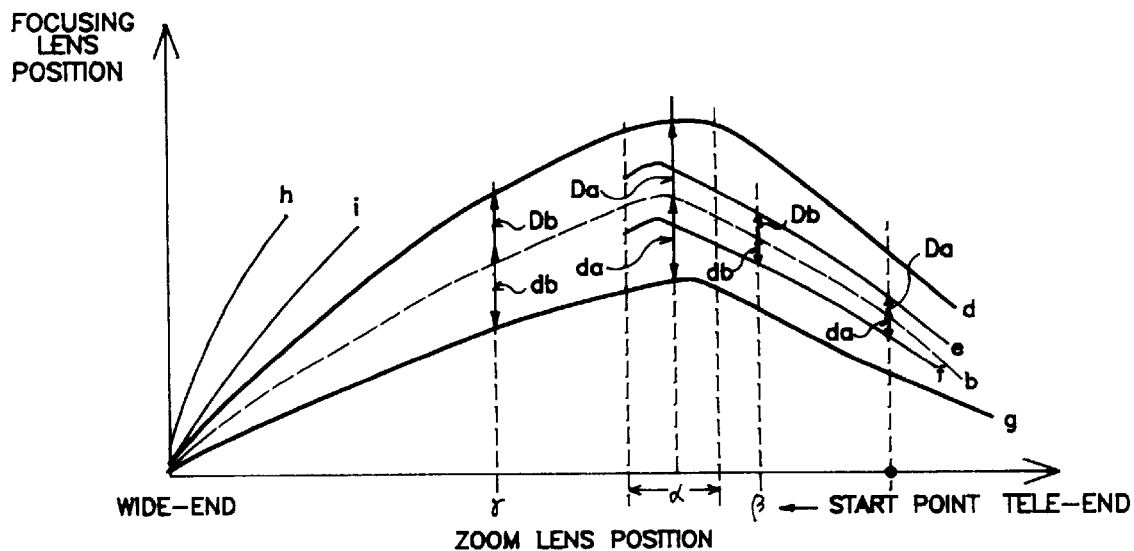
Figure 18:
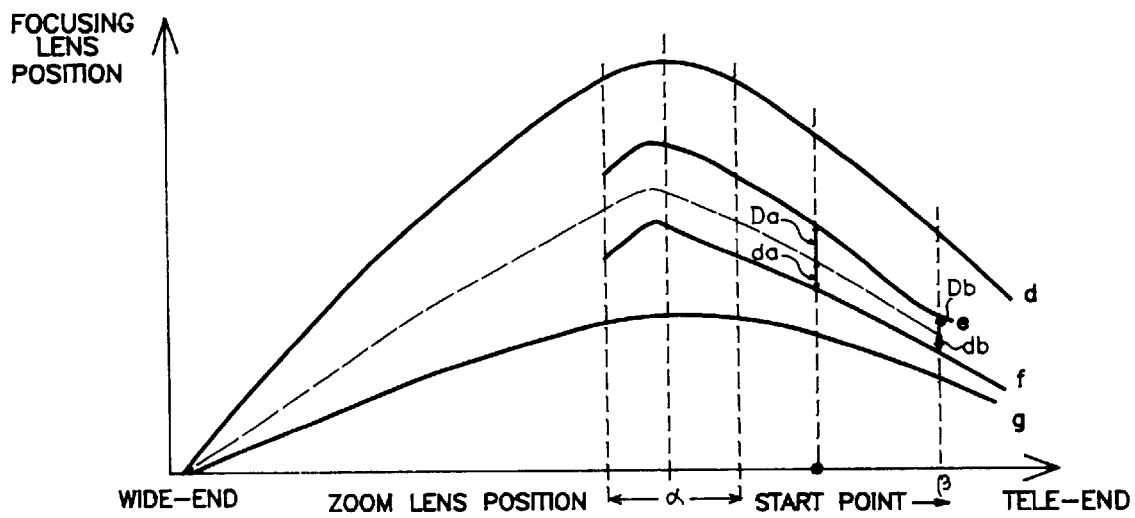
Figure 19:
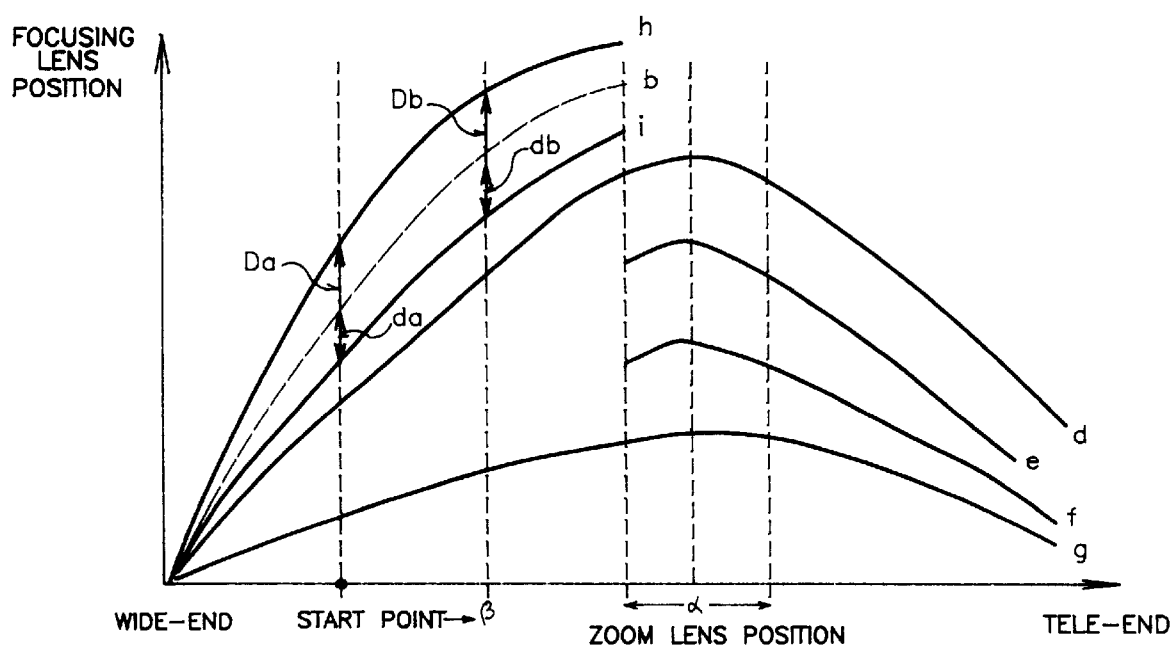

However, when the zoom lens 1 has been determined to be shifted toward the wide-end at the step S101 (FIG. 17), when the current position of the zoom lens 1 has been determined, at the step S102, to correspond to a tele-end-side position with respect to the reference position where there is no erroneous determination for the trace based on the object distance caused by the read error (FIG. 18), or when the current object distance b has been determined to be present between object distances h and i generating traces remarkably distinguished from other traces at the step 103 (FIG. 19), basic data Da and da for calculating the trace are calculated using data about traces of both the zoom lens 1 and the focusing lens 10 associated with various object distances, for example, including the object distances d, e, f, g, h, and i, which data are stored in the internal ROM of the control circuit 7 (Step 110) (FIGS. 17 to 19).

In other words, among the trace data associated with the object distances d, e, f, g, h, and i stored in the internal Ron of the control circuit 7, the data Da and the data da are detected which are indicative of the position difference of the focusing lens 10 resulting from the position difference between the upper and lower objects nearest to the object to be imaged and the position difference of the focusing lens 10 calculated using the difference between the position of the object to be imaged and the position of the lower object nearest to the object to be imaged. When a command for shifting the zoom lens 1 toward the tele-end is applied after execution of the step S107 (Step S108), the zoom motor 4 is driven so that the zoom lens 1 can be shifted toward the tele-end to execute a zooming (Step 109). On the other hand, when a command for shifting the zoom lens 1 toward the wide-end is applied after execution of the step S107, the zoom motor 4 is driven so that the zoom lens 1 can be shifted toward the wide-end to execute a zooming (Step 111).

After executing the zooming, the current position of the zoom lens 1 is detected again by the zoom position sensor 2 (step S112). Thereafter, a determination is made whether the zoom lens 1 is being shifted toward the tele-end or toward the wide-end (Step S113). When the zoom lens 1 is being shifted toward the tele-end, a determination is made whether the current position of the zoom lens 1 corresponds to a tele-end-side position with respect to a reference position of the zoom lens 1 where there is no erroneous determination for the trace based on the object distance caused by a read error generated upon reading the position of the zoom lens 1, (the point α of FIG. 16) (Step S114). If the current position of the zoom lens 1 does not correspond to the teleend-side position, a determination is then made whether the current position of the zoom lens 1 corresponds to the reference position (Step S115). When the current position of the zoom lens 1 does not correspond to the reference position, a determination is then made whether the current object distance b is present between object distances h and i generating traces remarkably distinguished from other traces (Step S116). Where the current object distance b is not present between the object distances h and i, a variation in evaluation value is checked by the evaluation value detector 15 (Step S117).

If an increment in evaluation value has been checked at the step S117, position data of the focusing lens 10 being shifted toward the tele-end in accordance with the shift of the zoom lens 1 is then stored in the internal ROM of the control circuit 7 (Step S118). If not, a determination is made whether the focusing lens 10 has reached a point where the evaluation value being incremented is decremented at the step S117. When the point is detected at the step S117, the shift state of the focusing lens 10 is then detected (Step S119). If the focusing lens 10 is being shifted, the driving of the stepping motor 11 is stopped in order to stop the shift of the focusing lens 10 (Step S120). If not, the shift speed of the focusing lens 10 is determined taking into consideration data on positions of both the zoom lens 1 and the focusing lens 10 at the maximum evaluation value and the shift speed of the zoom lens 1 (Step S121). Thereafter, the stepping motor 11 is driven so that the focusing lens 10 can be shifted upwards, as shown in FIG. 16 (Step S122).

Accordingly, as the zoom lens 1 is shifted toward the tele-end, the focusing lens 10 is shifted along the trace shown in FIG. 16. When the zoom lens 1 has been determined, at the step S115, to reach the reference position of the zoom lens 1 where there is no erroneous determination for the trace based on the object distance caused by a read error (the point α of FIG. 16), data Da is calculated which is indicative of the position difference of the focusing lens 10 using the difference between the positions e and f of the upper and lower objects nearest to the object to be imaged at the position of the zoom lens 1 associated with one of the points involving the maximum evaluation value and stored in the internal ROM of the control circuit 7 at the step S118, which point is present in the reference position range (range α of FIG. 16) where there is no erroneous determination for the trace based on the object distance caused by a read error, as shown in FIG. 16 (Step S123). At the step S123, data da is also calculated which is indicative of the position difference of the focusing lens 10 using the difference between the position b of the object to be imaged and the position f of the lower object nearest to the object to be imaged. Also, the number of objects to be imaged is calculated.

When the zoom lens 1 reaches a target position, that is, the point ▮ of FIG. 16 after executing the above procedure, data Db is calculated which is indicative of the position difference of the focusing lens 10 using the difference between the positions e and f of the upper and lower objects nearest to the object to be imaged and stored in the internal RON of the control circuit 7. Based on the calculated data Db, data db is calculated which is indicative of the position of the focusing lens 10 associated with the position of the object to be tracked at the shifted position of the zoom lens 1 (Step S124). Thereafter, a step S125 is executed for calculating the difference between the position of the focusing lens 10 calculated at the step S123 and the position of the focusing lens 10 associated with the position b of the object to be tracked and calculated at the step S124, and the shift direction. Based on the calculated position difference and the shift direction, the shift speed of the focusing lens 10 is calculated (Step S126). Subsequently, the stepping motor 11 is driven so that the focusing lens 10 can be shifted along the trace to be tracked (Step 127).

On the other hand, when the zooming start point has been determined to correspond to the tele-end-side position with respect to the reference position where there is no erroneous determination for the trace based on the object distance caused by the read error (the point α of FIG. 17) and the zoom lens 1 has been determined to be shifted toward the wide-end at the step S113 (FIG. 16), a determination is made whether the current position of the zoom lens 1 corresponds to the reference position (Step S128). When the current position of the zoom lens 1 does not correspond to the reference position, that is, when the target position of the zoom lens 1 is at the tele-end side with respect to the reference position (the point α of FIG. 17) the procedure proceeds to the step S124. At step 124, the position difference db of the focusing lens 10 at the target position of the zoom lens 1 (the point ▮ of FIG. 17) is calculated base on: the position difference Db of the focusing lens 10 calculated using the difference between the positions e and f of the upper and lower objects nearest to the object to be imaged at the target position (the point ▮ of FIG. 16) and the data detected at the step S108, that is, the position difference Da of the focusing lens 10 calculated using the difference between the positions e and f of the upper and lower objects nearest to the object to be imaged at the zooming start point; and the position difference da of the focusing lens 10 calculated using the difference between the position b of the object to be imaged and the position f of the lower object nearest to the object to be imaged. After executing the step S124, the step S125 and the steps following the step S125 are executed.

When the target position of the zoom lens 1 has been determined, at the step S128, to be at the wide-end side with respect to the reference position, a step S129 is executed for finding a point involving the maximum evaluation value in the reference position range (range α of FIG. 17) where there is no erroneous determination for the trace based on the object distance caused by a read error. The position difference Da of the focusing lens 10 is then calculated using the difference between the positions d and g of the upper and lower objects nearest to the object to be imaged at the point involving the maximum evaluation value and the position difference da of the focusing lens 10. The difference da is calculated using the difference between the position b of the object to be imaged and the position g of the lower object nearest to the object to be imaged at the point involving the maximum evaluation value. Thereafter, the procedure proceeds to the step S124 so as to calculate the position difference Db of the focusing lens 10 using the difference between the positions d and g of the upper and lower objects nearest to the object to be imaged at the target position of the zoom lens (the point γ of FIG. 17). The position difference db of the focusing lens 10 is also calculated at step 124 using the difference between the position b of the object to be imaged and the position g of the lower object nearest to the object to be imaged at the target position of the zoom lens 1, based on the calculated position difference Db of the focusing lens 10. After executing the step S124, the step S125 and the steps following the step S125 are executed.

When the zooming start point of the zoom lens 1 has been determined to correspond to the tele-end-side position with respect to the reference position where there is no erroneous determination for the trace based on the object distance caused by the read error (the point α of FIG. 18) and the zoom lens 1 has been determined to be shifted toward the tele-end at the step S113 (FIG. 18), the procedure proceeds to the step S124. At step 124, the data calculated at the step S123 is detected. The position difference Da of the focusing lens 10 is calculated at step 123 using the difference between the positions e and f of the upper and lower objects nearest to the object to be imaged at the zooming start point and the position difference da of the focusing lens 10 calculated using the difference between the position b of the object to be imaged and the position f of the lower object nearest to the object to be imaged. The position difference Db of the focusing lens 10 is calculated at step 124 using the difference between the positions e and f of the upper and lower objects nearest to the object to be imaged at the target position (the point ▮ of FIG. 18). The position difference db of the focusing lens 10 is calculated at step 124 using the difference between the position b of the object to be imaged and the position f of the lower object nearest to the object to be imaged at the target position of the zoom lens 1, based on the calculated position difference Db. After executing the step S124, the step S125 and the steps following the step S125 are executed.

When the zoom lens 1 is to be shifted toward the tele-end at the step S113, when the current position of the zoom lens 1 has been determined, at the step S114, to be at the tele-end-side with respect to the reference position where there in no erroneous determination for the trace based on the object distance caused by the read error, and when the current object distance b has been determined to be present between object distances h and i generating traces remarkably distinguished from other traces at the step 116 (FIG. 19), the procedure proceeds to the step S124. At step 124 the data calculated at the step S123 is detected. The position difference Da of the focusing lens 10 is calculated in step 123 using the difference between the positions h and i or the upper and lower objects nearest to the object to be imaged and the position difference da of the focusing lens 10 calculated using the difference between the position b of the object to be imaged and the position i of the lower object nearest to the object to be imaged. The position difference Db of the focusing lens 10 is calculated in step 124 using the difference between the positions h and i of the upper and lower objects nearest to the object to be imaged at the target position (the point ∎ of FIG. 18). The position difference db of the focusing lens 10 is calculated in step 124 using the difference between the position b of the object to be imaged and the position f of the lower object nearest to the object to be imaged at the target position of the zoom lens 1, based on the calculated position difference Db. After executing the step S124, the step S125 and the steps following the step S125 are executed.

As apparent from the above description, the present invention provides a zoom tracking apparatus and method in a video camera, capable of executing an offset adjustment rapidly and accurately. In accordance with the present invention, the quantity of data to be stored can be reduced. By virtue of such a reduction in data storage capacity, it is possible to reduce the use of RON equipped in a control circuit. The present invention also prevents bad focusing caused by position detection error in a zoom lens. As a result, it is possible to use A/D converters for the control circuit and thereby reduce the cost.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A zoom tracking apparatus in a video camera, comprising:

a zoom lens for changing the image size of an object;

a focusing lens for focusing the image of the object;

photoelectric conversion means for converting an optical image of said object produced by the zoom lens and the focusing lens into an output video signal;

evaluation value detection means for detecting a focus evaluation value of the output video signal from the photoelectric conversion means;

position detection means for detecting a position of the zoom lens and a position of the focusing lens; and control circuit means for storing zoom tracking curve data containing a relative position between the detected zoom lens position and the detected focusing lens position and controlling a position of the focus lens using zoom lens position information corresponding to a maximum focus evaluation value and the stored zoom tracking curve data, wherein, of the portion of the zoom tracking curve data in a wide region that includes curve traces that extend into a tele region, the control circuit means stores only the zoom-tracking curve data corresponding to a maximum object distance and a minimum object distance, and stores all of the zoom tracking curve data in the tele region.

2. A zoom tracking apparatus in accordance with claim 1, wherein the control means executes the zoom tracking such that the focus evaluation value becomes maximum in the wide region and executes the zoom tracking by the zoom tracking curve data in the tele region.

3. A zoom tracking apparatus in accordance with claim 2, wherein at a region between the wide region and the tele region in which the zoom-tracking curve data stored in the control means becomes discontinuous, and upon zooming from the wide region to the tele region, the control means selects the zoom tracking curve data corresponding to the tele region using the focus evaluation value; and wherein at the region between the wide region and the tele region and upon zooming from the tele region to the wide region, the control means calculates zoom tracking curve data in accordance with an intermediate ratio of a maximum zoom tracking curve data to a minimum zoom tracking curve data in the wide region.

4. A zoom tracking method in a video camera which moves the position of a focus lens to maintain an optimal focusing state according to the position movement of the zoom lens between a wide region and a tele region, in which, of the portion of the zoom tracking curve data in the wide region that includes curve traces that extend into the tele region, only zoom-tracking curve data corresponding to a maximum object distance and a minimum object distance is stored in the wide region and all of the zoom tracking curve data is stored in the tele region, said zoom tracking method comprising the steps of:

a) detecting a present position of the zoom lens;

b) determining whether a present object distance is between the maximum object distance and the minimum object distance at times when the detected present position of the zoom lens is in the wide region, moving the position of the focus lens so that a focus evaluation value becomes maximum without using zoom tracking curve data; and c) moving the position of the focus lens in accordance with the zoom tracking curve data corresponding to an object distance at times when the detected present position of the zoom lens is in the tele region.

5. A zoom tracking method in a video camera in accordance with claim 4, further comprising the step of:

d) selecting the zoom tracking curve data in the tele region using the present position of the zoom lens and a present position of the focus lens corresponding to a maximum focus evaluation value at times when the zoom lens moves from the wide region to the tele region, and then executing the zoom tracking using the selected zoom tracking curve data.

6. A zoom tracking method in a video camera in accordance with claim 5, further comprising the step of:

e) calculating, at times when the zoom lens moves from the tele region to the wide region, the zoom tracking curve data using the selected zoom tracking curve data in the wide region, at a region between the wide region and the tele region in which region the zoom-tracking curve data stored in the control means becomes discontinuous, and in the tele region, and then executing the zoom tracking using the calculated zoom tracking curve data.

* * * * *